(12) United States Patent
Channabasavaiah et al.

(10) Patent No.: US 8,392,540 B2
(45) Date of Patent: Mar. 5, 2013

(54) SERVICE SPECIFIC SERVICE ORIENTED ARCHITECTURE SHARED SERVICES SOLUTION

(75) Inventors: Kishore Channabasavaiah, Palatine, IL (US); Stephen C. Kendrick, Fairfax, VA (US); Raghu Varadan, San Francisco, CA (US); Nevenko Zunic, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 1046 days.

(21) Appl. No.: 12/391,728

(22) Filed: Feb. 24, 2009

(65) Prior Publication Data

US 2010/0218163 A1    Aug. 26, 2010

(51) Int. Cl.
*G06F 15/177* (2006.01)
*G06F 9/44* (2006.01)

(52) U.S. Cl. ........................................ 709/220; 717/104
(58) Field of Classification Search ........ 705/7.11–7.42; 717/100–167; 709/220
See application file for complete search history.

(56) References Cited

U.S. PATENT DOCUMENTS

| | | | |
|---|---|---|---|
| 2004/0019500 A1* | 1/2004 | Ruth | 705/1 |
| 2004/0093381 A1 | 5/2004 | Hodges et al. | |
| 2006/0059253 A1 | 3/2006 | Goodman et al. | |
| 2006/0235733 A1* | 10/2006 | Marks | 705/7 |
| 2007/0022404 A1 | 1/2007 | Zhang et al. | |
| 2008/0066048 A1 | 3/2008 | Hafermann et al. | |
| 2008/0077652 A1 | 3/2008 | Grant et al. | |
| 2008/0288944 A1* | 11/2008 | Coqueret et al. | 718/100 |
| 2009/0210499 A1* | 8/2009 | Upadhyayula et al. | 709/206 |
| 2010/0217633 A1* | 8/2010 | Channabasavaiah et al. | 705/7 |

FOREIGN PATENT DOCUMENTS

| | | |
|---|---|---|
| JP | 2006099162 A | 4/2006 |
| WO | 2008011122 A2 | 1/2008 |

* cited by examiner

*Primary Examiner* — Jeong S Park
(74) *Attorney, Agent, or Firm* — William E. Schiesser; Keohane & D'Alessandro PLLC

(57) ABSTRACT

An approach for designing a service specific service oriented architecture (SOA) shared services solution is provided. In one embodiment, there is a service solution tool, including a refinement component configured to receive a set of service requirements for a set of SOA shared services that are developed as part of a potential SOA shared services project, and refine the set of service requirements for the set of SOA shared services. A design component is configured to design a service specific SOA shared services solution based on a refined set of service requirements for the set of service requirements for the set of SOA shared services.

14 Claims, 5 Drawing Sheets

180

SERVICE SPECIFIC SERVICE ORIENTED ARCHITECTURE SHARED SERVICES SOLUTION

CROSS-REFERENCE TO RELATED APPLICATIONS

The present application is related in some aspects to commonly owned and co-pending application entitled "Identification of a Service Oriented Architecture Shared Services Project", which was filed on Nov. 24, 2008, and was assigned application Ser. No. 12/277,280, commonly owned and co-pending application entitled "Evaluating a Service Oriented Architecture Shared Services Project", which was filed on Feb. 19, 2009, and was assigned application Ser. No. 12/388,533, commonly owned and co-pending application entitled "Selecting a Service Oriented Architecture Shared Service", which was filed on Feb. 24, 2009, and was assigned application Ser. No. 12/391,426, commonly owned and co-pending application entitled "Constructing a Service Oriented Architecture Shared Service", which was filed on Feb. 25, 2009, and was assigned application Ser. No. 12/392,189, commonly owned and co-pending application entitled "Transitioning to Management of a Service Oriented Architecture Shared Service", which was filed on Feb. 25, 2009, and was assigned application Ser. No. 12/392,567, commonly owned and co-pending application entitled "Management of a Service Oriented Architecture Shared Service", which was filed on Feb. 26, 2009, and was assigned application Ser. No. 12/393,110, commonly owned and co-pending application entitled "Managing Service Oriented Architecture (SOA) Shared Service Escalation", which was filed on Feb. 24, 2009, and was assigned application Ser. No. 12/391,362, the entire contents of which are herein incorporated by reference.

FIELD OF THE INVENTION

This invention relates generally to lifecycle management and more specifically to SOA shared service lifecycle management.

BACKGROUND OF THE INVENTION

In the past, software architectures have attempted to deal with increasing levels of software complexity. As the level of complexity continues to increase, traditional architectures are reaching the limit of their ability to deal with various problems. At the same time, traditional needs of information technology (IT) organizations persist. IT organizations need to respond quickly to new requirements of the business, while continuing to reduce the cost of IT to the business by absorbing and integrating new business partners, new business sets, etc.

Current IT lifecycle processes are configured to managing self-contained and siloed solutions. However, as businesses transition to service oriented architectures (SOA), traditional IT governance methods are inadequate at managing SOA shared services during their entire lifecycle. SOA is not a self-contained and siloed solution; rather it's a decomposition of solutions into a set of shared services. It is these SOA shared services that require a new lifecycle management system which takes into consideration multiple new processes that are not available or part of existing IT governance systems.

SUMMARY OF THE INVENTION

In one embodiment, there is a method for designing a service specific service oriented architecture (SOA) shared services solution. In this embodiment, the method comprises: receiving a set of service requirements for a set of SOA shared services that are developed as part of a potential SOA shared services project; refining the set of service requirements for the set of SOA shared services; and designing a service specific SOA shared services solution based on the refining.

In a second embodiment, there is a system for designing a service specific service oriented architecture (SOA) shared services solution. In this embodiment, the system comprises at least one processing unit, and memory operably associated with the at least one processing unit. There is a service solution tool, including a refinement component configured to receive a set of service requirements for a set of SOA shared services that are developed as part of a potential SOA shared services project, and refine the set of service requirements for the set of SOA shared services. A design component is configured to design a service specific SOA shared services solution based on the refined set of service requirements for the set of service requirements for the set of SOA shared services.

In a third embodiment, there is a computer-readable medium storing computer instructions, which when executed, enables a computer system to design a service specific service oriented architecture (SOA) shared services solution, the computer instructions comprising: receiving a set of service requirements for a set of SOA shared services that are developed as part of a potential SOA shared services project; refining the set of service requirements for the set of SOA shared services; and designing a service specific SOA shared services solution based on the refining.

In a fourth embodiment, there is a method for deploying a service solution tool for use in a computer system that provides for design of a service specific service oriented architecture (SOA) shared services solution. In this embodiment, a computer infrastructure is provided and is operable to: receive a set of service requirements for a set of SOA shared services that are developed as part of a potential SOA shared services project; refine the set of service requirements for the set of SOA shared services; and design a service specific SOA shared services solution based on the refined set of service requirements for the set of SOA shared services.

Figure 1:
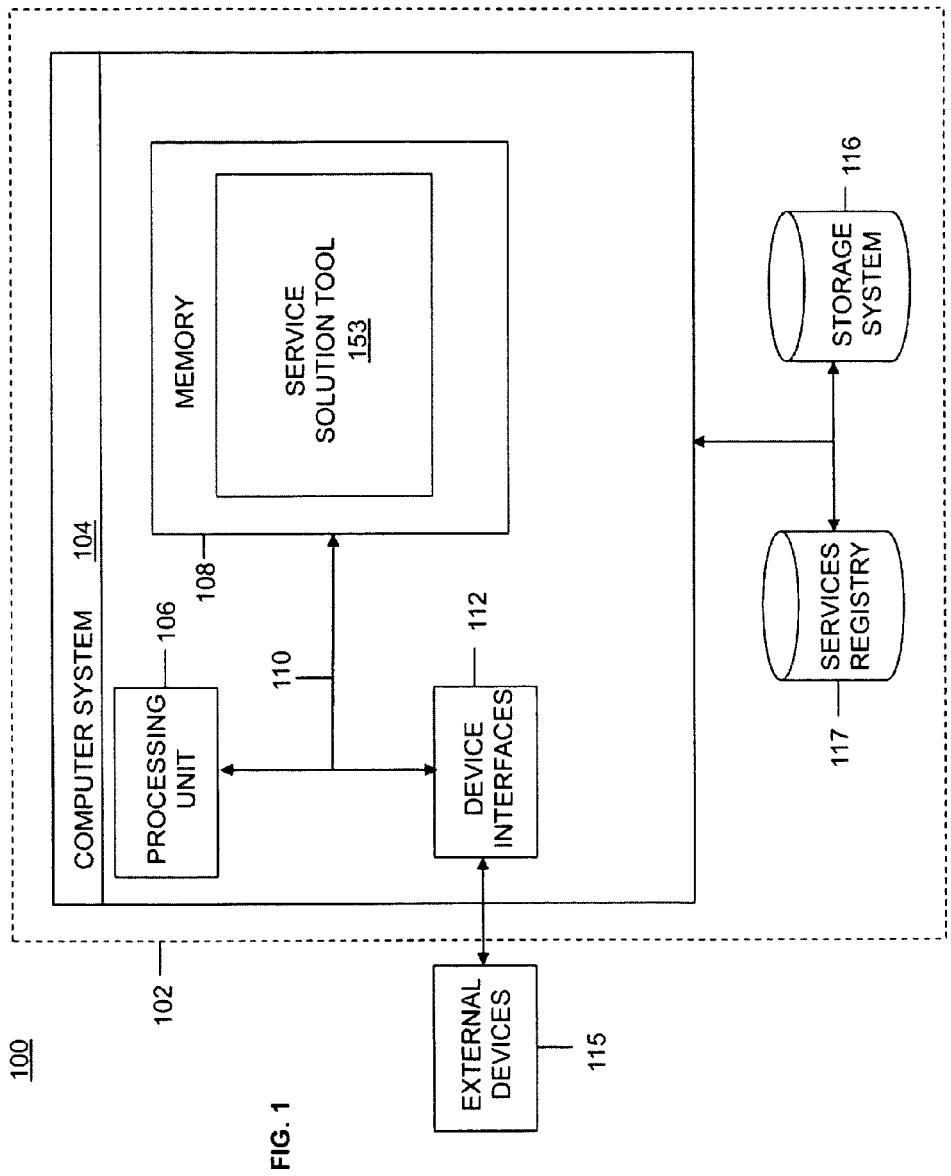
FIG. 1 shows a schematic of an exemplary computing environment in which elements of the present invention may operate.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Embodiments of this invention are directed to designing a service specific service oriented architecture (SOA) shared services solution. In these embodiments, a service solution tool provides this capability. Specifically, the service solution tool comprises a refinement component configured to receive a set of service requirements for a set of SOA shared services that are developed as part of a potential SOA shared services project, and refine the set of service requirements for the set of SOA shared services. The service solution tool further comprises a design component configured to design a service specific SOA shared services solution based on the refined set of service requirements for the set of SOA shared services.

FIG. 1 illustrates a computerized implementation 100 of the present invention. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

Computer system 104 is intended to represent any type of computer system that may be implemented in deploying/realizing the teachings recited herein. In this particular example, computer system 104 represents an illustrative system for designing a service specific SOA shared services solution. It should be understood that any other computer(s) implemented under the present invention may have different components/software, but will perform similar functions. As shown, computer system 104 includes a processing unit 106, memory 108 for storing a service solution tool 153, a bus 110, and device interfaces 112.

Processing unit 106 collects and routes signals representing outputs from external devices 115 (e.g., a keyboard, a pointing device, a display, a graphical user interface, etc.) to service solution tool 153. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different external devices may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 106 executes computer program code, such as program code for operating service solution tool 153, which is stored in memory 108 and/or storage system 116. While executing computer program code, processing unit 106 can read and/or write data to/from memory 108, storage system 116, and a services registry 117. Services registry 117 stores a plurality of SOA services and associated metadata, as well as rules against which the metadata is compared to locate, store, and update SOA shared services. Storage systems 116, 117 can include VCRs, DVRs, RAID arrays, USB hard drives, optical disk recorders, flash storage devices, or any other similar storage device.

Figure 2:
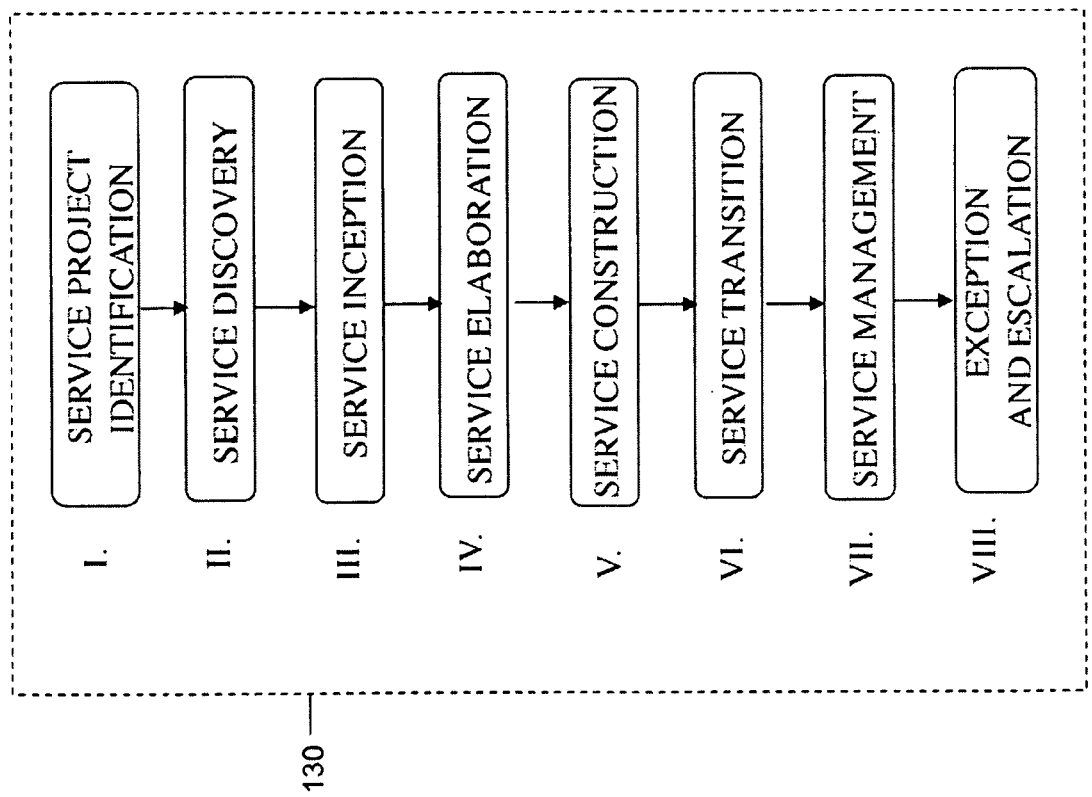
FIG. 2 shows a flow diagram of a SOA services lifecycle management process.

Implementation 100 and service solution tool 153 operate within a broader SOA services lifecycle management process (SLMP) 130, shown in FIG. 2, which identifies, elaborates, implements, and manages a SOA shared service solution. SOA SLMP 130 includes distinct roles, governance checkpoints, increased collaboration requirements, and decision control points. SOA SMLP 130 takes an extended view in identifying the various touch-points of an organization to plan, build and manage shared services. The initial process starts with the identification of a business initiative(s) (e.g., a business need) having the potential of being a shared service project candidate. The overall process ends with the rollout of shared services fulfilling the identified business initiative, as well as management across its entire life.

SOA SLMP 130 of the present invention consists of the following distinct processes and associated methodologies:

I. New Service Project Identification—the goal of this phase is to evaluate and identify a SOA shared services opportunity (i.e., a business need), and to determine if the SOA shared services opportunity can be met through the use of SOA shared services.

II. Service Discovery—the goal of this phase is to complete the Discovery phase for a project that has been identified as a potential SOA services candidate project.

III. Service Inception—the goal of this phase is to gather the high level requirements and select the SOA shared services that will be developed as part of the potential SOA services candidate project.

IV. Service Elaboration—the goal of this phase is to further define the high level requirements from the Inception phase into detailed requirements to complete the SOA shared service solution design and prepare for the build phase.

V. Service Construction—the goal of this phase is to develop the integration components and integrate the SOA shared services components per the design guidelines while meeting/exceeding the necessary quality requirements so that the services can be deployed for general use.

VI. Service Transition—the goal of this phase is to transition the SOA shared services developed in the Construction phase to the operations team that will be responsible for ongoing SOA shared service maintenance.

VII. Manage Services—the goal of this phase is to manage the SOA shared services once they have been transitioned to the operations team that will be responsible for ongoing SOA shared service maintenance.

VIII. Exception and Escalation—the goal of this phase is resolve issues that occur during the SOA services lifecycle process in an expedient manner.

It can be appreciated that each of the above processes is a complete methodology that can be implemented independently since they define key stakeholders, affected processes, and touch-points throughout the organization. Each of the above listed SOA processes are non-limiting examples of the functionality and operation of possible implementations of systems, methods and computer program products according to various embodiments of the present invention. In this regard, each process (I-VIII) may represent a module, segment, or portion of code, which comprises one or more executable instructions for implementing the specified logical function(s) of SOA SLMP 130, as shown in FIG. 2. It should also be noted that, in some alternative implementations, the functions noted in SOA SLMP 130 may occur out of the order listed above in processes I-VIII. For example, two processes shown in FIG. 2 in succession may, in fact, be executed substantially concurrently. It should also be noted that, in another alternative embodiment, additional or fewer process steps may be included in SOA SLMP 130. Further, each process of the flowchart of FIG. 2 can be implemented by special purpose hardware-based systems that perform the specified functions or acts, or combinations of special purpose hardware and computer instructions.

Figure 3:
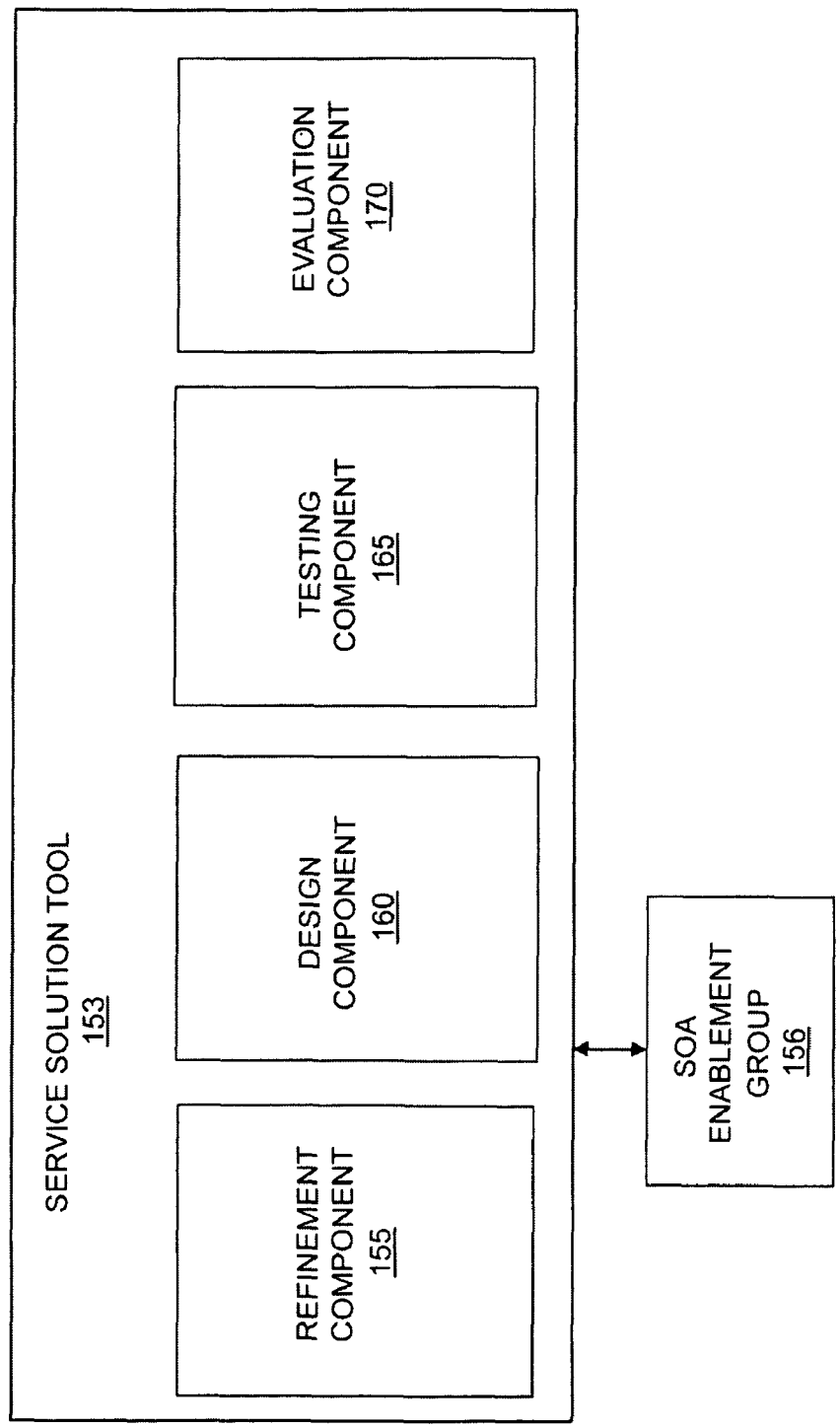
FIG. 3 shows a service solution tool that operates in the environment shown in FIG. 1.

FIG. 3 shows a more detailed view of service solution tool 153 that designs a service specific SOA shared services solution. As shown, service solution tool 153 comprises a refinement component 155 configured to receive a set of service requirements (typically high-level service requirements) for a set of SOA shared services that are developed as part of a potential SOA shared services project, which was established to address a SOA shared services opportunity (i.e., a business need). Refinement component 155 is configured to refine the set of service requirements for the set of SOA shared services. In one embodiment, refinement component 155 refines the integration criteria for each of the set of service requirements for each of the set of shared services. Refinement component 155 evaluates integration requirements based on various business strategies and requirements (BS&R) that were identified during the service inception phase (FIG. 2). These BS&R may be organized within a business strategy and requirements document (BSRD) for later access and use.

In another embodiment, refinement component 155 refines a service architecture for the set of SOA shared services based on the refined integration criteria for each of the service requirements for each of the set of SOA shared services. In this embodiment, information integration patterns for the service specific SOA shared services solution are compared against the refined integration criteria for each of the set of service requirements for compliance. Refinement component 155 is configured to analyze the set of SOA shared services for compliance with service enablement group 156 (SEG) architecture governance standards. It will be appreciated that SEG 156 described herein may represent a committee or group of individuals within an organization, or may represent a module, segment, or portion of code, which comprises one or more executable instructions for implementing the elaboration of the potential SOA shared services solution.

In another embodiment, a plurality of non-SEG governing bodies (e.g., Enterprise Architecture Team, Executive Councils, Governance Center of Excellence, Governance Board, Compliance Review Boards, Special Interest Groups (e.g., for Security, Performance)) may review the service specific SOA shared services solution for adherence to their respective standards for security, capacity, etc. Specifically, refinement component 155 is configured to analyze each of the set of service requirements for each of the set of SOA shared services for compliance with non-SEG standards. This allows non-SEG governance bodies to apply compliance standards to the SOA shared services. For example, SOA shared services may have shared design points with service consumers and providers requiring collaborative design sessions between a project delivery team and resources from other teams involved in the potential SOA shared services project. In this case, the non-SEG governance bodies apply compliance processes for the shared design points against the SOA shared services.

Next, a design solution is established based on a review of the service requirements and the service architecture for the set of SOA shared services. Specifically, service solution tool 153 comprises a design component 160 configured to design a service specific SOA shared services solution based on the refined set of service requirements for the set of SOA shared services. For example, design component 160 is configured to define the input and output message formats that will be used by the SOA shared service, define message protocols for each SOA shared service, and define message flow requirements (e.g., message format mediation, protocol mediation, message filter rules, message enrichment rules, etc.). The service specific SOA shared services solution represents the rules, processes and detailed construction requirements necessary to proceed to the service construction phase of SOA SLMP 130 (FIG. 2).

In some cases, it is beneficial to evaluate the service specific SOA shared services solution by testing a prototype solution. To accomplish this, service solution tool 153 comprises a testing component 165 configured to develop a prototype of the service specific SOA shared services solution, and evaluate the prototype of the service specific SOA shared services solution. Testing component 165 may build any number of prototypes to demonstrate and subsequently evaluate the defined message flow requirements of the solution. In one embodiment, testing component 165 is configured to establish a service specific development and testing infrastructure to develop and evaluate the service specific SOA shared services solution. In this embodiment, testing component 165 may develop integration test cases that validate the service specific SOA shared services solution for business functionality. For example, testing component 165 may determine whether the service specific SOA shared services solution meets the business requirements as defined in the BSRD, as well as the necessary technical requirements in terms of data integrity, performance, etc. Test cases, along with the required test scripts, may be defined to evaluate the integration points required to integrate various entities associated with a SOA shared service (e.g., consumer and provider applications).

Next, the service specific SOA shared services solution is reviewed for potential approval. Service solution tool 153 comprises an evaluation component 170 configured to evaluate the service specific SOA shared services solution, including any prototypes or test cases developed to observe the effectiveness of the solution. Evaluation component 170 then initiates construction of the service specific SOA shared services solution based on the evaluation. In one embodiment, the service specific SOA shared services solution is evaluated based on subsystem and component specifications. This involves collaborative design sessions between various entities involved in the project, communication and validation of service testing approaches, and complete service and component system mapping of dependencies (including business and information architectures). Further, evaluation component 170 confirms the alignment of the specified SOA service with business goals, and validates specified ownership, service, information, flow, standards, best practices, templates and compliance. Based on this evaluation, services registry 117 is notified that the service specific SOA shared services solution has been reviewed and approved for construction.

Figure 4:
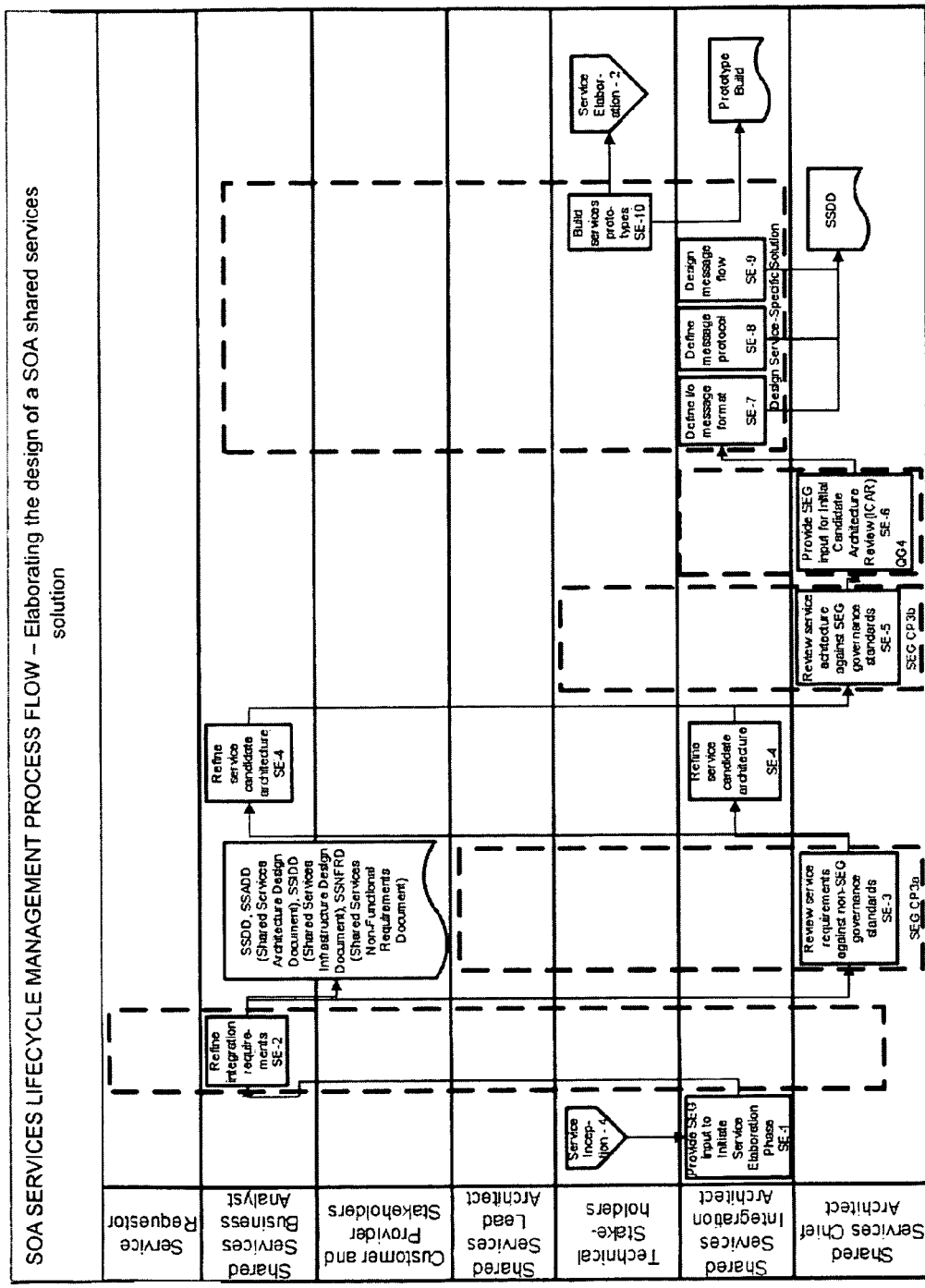
FIG. 4 shows a flow diagram of a SOA services lifecycle management process for designing a service specific SOA shared services solution.

Referring now to FIG. 4, a SOA services lifecycle management process (SLMP) flow 180 for designing a SOA shared services solution will be described in further detail. As shown, the SOA SLMP flow 180 first receives a set of service requirements for a set of SOA shared services from the service inception phase and provides this as input to initiate the service elaboration phase at service elaboration (SE)-1. At SE-2, the integration requirements/criteria for each of the set of service requirements are refined. In one embodiment, these refined requirements are input to a plurality of design documents/modules (i.e., Shared Services Design Document, Shared Services Architecture Design Document, Shared Services Infrastructure Design Document, and Shared Services Non-Functional Requirements Document) for further use within the elaboration process. At SE-3, SOA shared service requirements are reviewed against non-SEG governance standards. Next, at SE-4 the service architecture for each SOA shared service is refined based on the integration criteria refined at SE-2. At SE-5, the service architecture for each of the SOA shared services is analyzed for compliance with SEG architecture governance standards.

SOA SLMP flow 180 then proceeds to design the service specific SOA shared services solution based on the refined service requirements for the SOA shared services. As shown at SE-7, SE-8, and SE-9, respectively, definitions are established for the input and output message formats that will be used by the service, the message protocols for each service, and the message flow requirements. These definitions are then input to the Shared Services Design Document and the process proceeds to SE-10, where prototypes are built. The prototype, which is based on the service specific SOA shared services solution, is developed and then evaluated.

Figure 5:
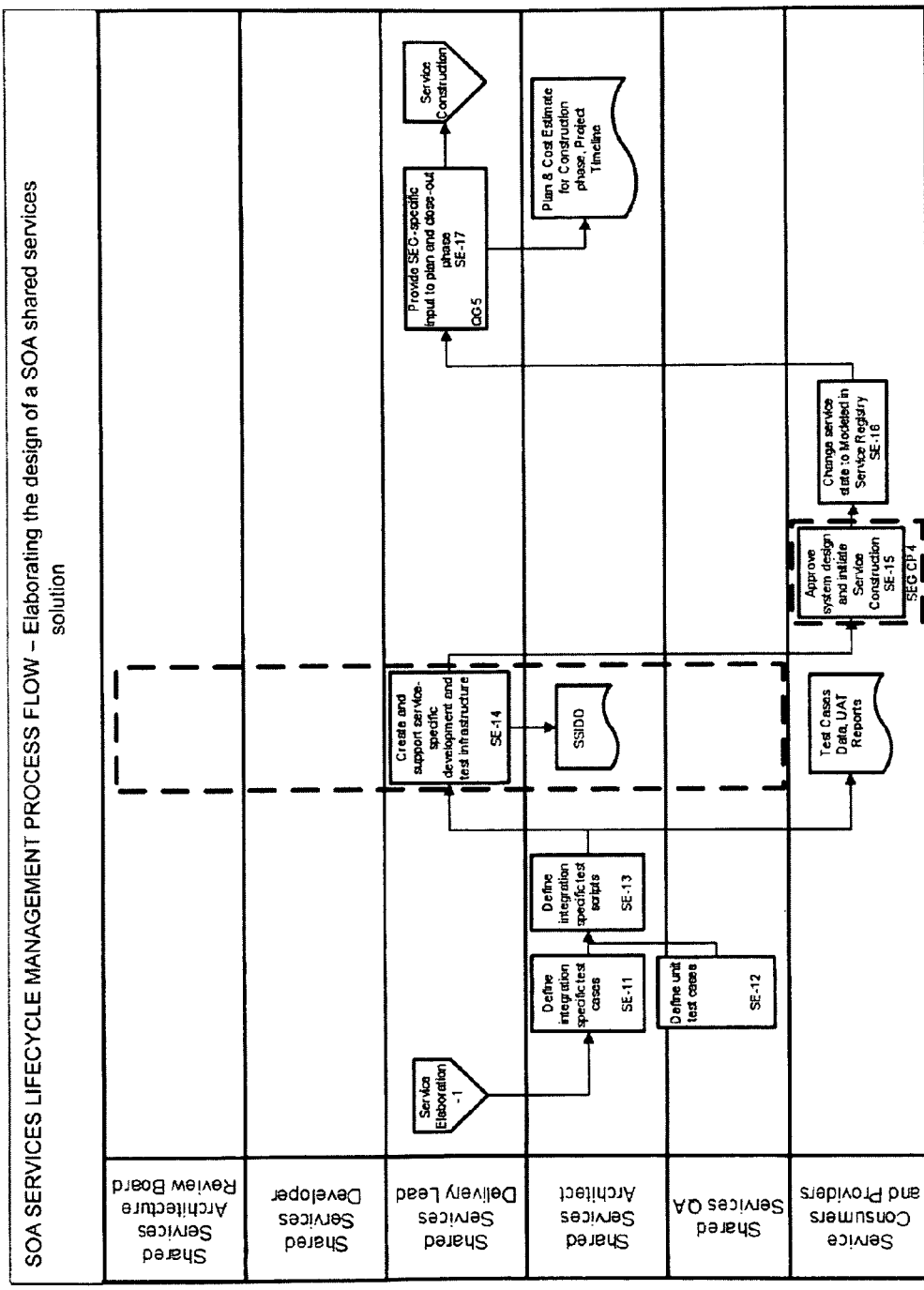
FIG. 5 shows a flow diagram of a SOA services lifecycle management process for designing a service specific SOA shared services solution.

Next, as shown in FIG. 5, SOA SLMP flow 180 proceeds to SE-11, where integration specific test cases are developed for the service specific SOA shared services solution. Unit test cases and integration specific test scripts are defined at SE-12 and SE-13, respectively. Next, at SE-14 a service specific development and testing infrastructure is established to develop and evaluate the service specific SOA shared services solution. Based on the evaluation and testing, the service specific SOA shared services solution is approved at SE-15, and service specific SOA shared service solution construction is initiated. The status of the SOA shared service is updated (e.g., to "modeled") within Services Registry 117 (FIG. 1) at SE-16. At SE-17, SEG-specific input is provided to plan and close-out the phase. The SEG group is provided input to review and create estimates for the service construction phase, and the process proceeds to the service construction phase (FIG. 2).

As shown, FIGS. 4-5 detail the organizational roles and responsibilities for each entity in SOA SLMP flow 180. Specifically, SOA SLMP flow 180 identifies shared service roles indicating the primary and secondary (if applicable) roles for each entity (i.e., Service Requestor, Shared Services Business Analyst, Customer and Provider Stakeholders, Shared Services Lead Architect, etc.) at each process of the potential SOA shared services project. For example, at SE-2, the Shared Services Business Analyst is considered to have primary responsibility for refining integration requirements. The Service Requestor, Customer and Provider Stakeholders, Shared Services Lead Architect, etc., are considered to have secondary responsibility. This may mean that the Shared Services Business Analyst is given authority and accountability to ultimately control the refinement at SE-2. In this regard, SOA SLMP flow 180 governs the rules of engagement between the various entities. SOA SLMP flow 180 provides integration points between the various entities across different organizational domains involved in the development, integration, deployment and management of SOA shared services, as discussed herein.

It will be appreciated that SOA SLMP flow 180 of FIGS. 4-5 represents one possible implementation of a process flow for designing a SOA shared services solution, and that other process flows are possible within the scope of the invention. SOA SLMP flow 180 illustrates the architecture, functionality, and operation of possible implementations of systems, methods and computer program products according to various embodiments of the present invention. In this regard, each portion of SOA SLMP flow 180 may represent a module, segment, or portion of code, which comprises one or more executable instructions for implementing the specified logical function(s). It will also be noted that each block of flowchart illustration can be implemented by special purpose hardware-based systems that perform the specified functions or acts, or combinations of special purpose hardware and computer instructions.

Further, it can be appreciated that the methodologies disclosed herein can be used within a computer system to provide the design of a SOA shared services solution, as shown in FIG. 1. In this case, service solution tool 153 can be provided, and one or more systems for performing the processes described in the invention can be obtained and deployed to computer infrastructure 102. To this extent, the deployment can comprise one or more of (1) installing program code on a computing device, such as a computer system, from a computer-readable storage medium; (2) adding one or more computing devices to the infrastructure; and (3) incorporating and/or modifying one or more existing systems of the infrastructure to enable the infrastructure to perform the process actions of the invention.

The exemplary computer system 104 may be described in the general context of computer-executable instructions, such as program modules, being executed by a computer. Generally, program modules include routines, programs, people, components, logic, data structures, and so on that perform particular tasks or implements particular abstract data types. Exemplary computer system 104 may be practiced in distributed computing environments where tasks are performed by remote processing devices that are linked through a communications network. In a distributed computing environment, program modules may be located in both local and remote computer storage media including memory storage devices.

Furthermore, an implementation of exemplary computer system 104 may be stored on or transmitted across some form of computer readable storage medium. Computer readable storage medium can be any available media that can be accessed by a computer.

"Computer-readable storage medium" includes volatile and non-volatile, removable and non-removable media implemented in any method or technology for storage of information such as computer readable instructions, data structures, program modules, or other data. Computer-readable storage medium includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other storage medium which can be used to store the desired information and which can be accessed by a computer.

"Communication media" typically embodies computer readable instructions, data structures, program modules, or other data.

By way of example, and not limitation, communication media includes wired media such as a wired network or direct-wired connection, and wireless media such as acoustic, RF, infrared, and other wireless media. Combinations of any of the above are also included within the scope of computer-readable storage medium.

It is apparent that there has been provided with this invention an approach for elaborating the design of a SOA shared services solution. While the invention has been particularly shown and described in conjunction with a preferred embodiment thereof, it will be appreciated that variations and modifications will occur to those skilled in the art. Therefore, it is to be understood that the appended claims are intended to cover all such modifications and changes that fall within the true spirit of the invention.

What is claimed is:

1. A method for designing a service specific service oriented architecture (SOA) shared services solution, the method comprising:
   receiving a set of service requirements for a set of SOA shared services that are developed as part of a potential SOA shared services project;
   refining the set of service requirements for the set of SOA shared services, the refining comprising:
      refining integration criteria for each of the set of service requirements for each of the set of SOA shared services; and
      analyzing a set of shared design points among multiple key stakeholders of the potential SOA shared services project based on the refined integration criteria for each of the set of service requirements for each of the set of SOA shared services; and
      refining a service architecture for the set of SOA shared services based on the analyzing; and
      designing a service specific SOA shared services solution based on the refining;
   establishing a service specific development and testing infrastructure to develop and evaluate the service specific SOA shared services solution;
   developing a prototype of the service specific SOA shared services solution; and
   evaluating the prototype of the service specific SOA shared services solution.

2. The method according to claim 1 further comprising:
   evaluating the service specific SOA shared services solution; and
   initiating construction of the service specific SOA shared services solution based on the evaluating.

3. The method according to claim 1, the analyzing comprising analyzing the service architecture for the set of SOA shared services for compliance with service enablement group (SEG) architecture governance standards.

4. The method according to claim 3 further comprising analyzing each of the set of service requirements for each of the set of SOA shared services for compliance with non-SEG governance standards.

5. A system for designing a service specific service oriented architecture (SOA) shared services solution, the system comprising:
   at least one processing unit;
   memory operably associated with the at least one processing unit; and
   a service solution tool storable in memory and executable by the at least one processing unit, the service solution tool comprising:
      a refinement component configured to:
         receive a set of service requirements for a set of SOA shared services that are developed as part of a potential SOA shared services project; and
         refine the set of service requirements for the set of SOA shared services, the refining comprising:
            refining integration criteria for each of the set of service requirements for each of the set of SOA shared services;
            analyzing a set of shared design points among key stakeholders of the potential SOA shared services project based on the refined integration criteria for each of the set of service requirements for each of the set of SOA shared services; and
            refining a service architecture for the set of SOA shared services based on the analyzing;
      a design component configured to design a service specific SOA shared services solution based on a refined set of service requirements for the set of SOA shared services; and
      a testing component configured to:
         develop a prototype of the service specific SOA shared services solution;
         evaluate the prototype of the service specific SOA shared services solution; and
         establish a service specific development and testing infrastructure to develop and evaluate the service specific SOA shared services solution.

6. The service solution tool according to claim 5 further comprising an evaluation component configured to:
   evaluate the service specific SOA shared services solution; and
   initiate construction of the service specific SOA shared services solution based on an evaluated service specific SOA shared services solution.

7. The service solution tool according to claim 5, the refinement component further configured to analyze the service architecture for the set of SOA shared services for compliance with service enablement group (SEG) architecture governance standards.

8. The service solution tool according to claim 7, the refinement component further configured to analyze each of the set of service requirements for each of the set of SOA shared services for compliance with non-SEG governance standards.

9. A non-transitory computer-readable storage medium storing computer instructions, which when executed, enables a computer system to design a service specific service oriented architecture (SOA) shared services solution, the computer instructions comprising:
   receiving a set of service requirements for a set of SOA shared services that are developed as part of a potential SOA shared services project;
   refining the set of service requirements for the set of SOA shared services, the refining comprising:
      refining integration criteria for each of the set of service requirements for each of the set of SOA shared services;
      analyzing a set of shared design points among key stakeholders of the potential SOA shared services project based on the refined integration criteria for each of the set of service requirements for each of the set of SOA shared services; and
      refining a service architecture for the set of SOA shared services based on the analyzing; and
      designing a service specific SOA shared services solution based on the refining;
   establishing a service specific development and testing infrastructure to develop and evaluate the service specific SOA shared services solution;
   developing a prototype of the service specific SOA shared services solution; and
   evaluating the prototype of the service specific SOA shared services solution.

10. The non-transitory computer-readable storage medium according to claim 9 further comprising computer instructions for:
    evaluating the service specific SOA shared services solution; and
    initiating construction of the SOA service specific shared services solution based on the evaluating.

11. The non-transitory computer-readable storage medium according to claim 9 further comprising computer instructions for analyzing the service architecture for the set of SOA shared services for compliance with service enablement group (SEG) architecture governance standards.

12. The non-transitory computer-readable storage medium according to claim 11 further comprising computer instructions for analyzing each of the set of service requirements for each of the set of SOA shared services for compliance with non-SEG governance standards.

13. A method for deploying a service solution tool for use in a computer system that provides design of a service specific service oriented architecture (SOA) shared services solution, the method comprising:

providing a computer infrastructure operable to:
      receive a set of service requirements for a set of SOA shared services that are developed as part of a potential SOA shared services project;
      refine the set of service requirements for the set of SOA shared services, the refining comprising:
         refining integration criteria for each of the set of service requirements for each of the set of SOA shared services;
         analyzing a set of shared design points among key stakeholders of the potential SOA shared services project based on the refined integration criteria for each of the set of service requirements for each of the set of SOA shared services; and
         refining a service architecture for the set of SOA shared services based on the analyzing;
      design a service specific SOA shared services solution based on a refined set of services requirements for the set of SOA shared services;
      establish a service specific development and testing infrastructure to develop and evaluate the service specific SOA shared services solution;
      develop a prototype of the service specific SOA shared services solution; and
      evaluate the prototype of the service specific SOA shared services solution.

14. The method according to claim 13, the computer infrastructure further operable to:
   evaluate the service specific SOA shared services solution; and
   initiate construction of the SOA service specific shared services solution based on the evaluating.

* * * * *